(12) United States Patent
Zaghib et al.

(10) Patent No.: US 7,993,621 B2
(45) Date of Patent: Aug. 9, 2011

(54) SURFACE PREPARATION OF NATURAL GRAPHITE AND THE EFFECT OF IMPURITIES ON GRINDING AND THE PARTICLE DISTRIBUTION

(75) Inventors: Karim Zaghib, Québec (CA); Michel Gauthier, Québec (CA); Gabrielle Nadeau, Québec (CA); Abdelbast Guerfi, Québec (CA); Monique Massé, Québec (CA); Fernand Brochu, Québec (CA); Michel Armand, Queébec (CA)

(73) Assignee: Hydro-Quebec, Quebec (CA)

( * ) Notice: Subject to any disclaimer, the term of this patent is extended or adjusted under 35 U.S.C. 154(b) by 915 days.

(21) Appl. No.: 11/790,020

(22) Filed: Apr. 23, 2007

(65) Prior Publication Data
US 2007/0194158 A1 Aug. 23, 2007

Related U.S. Application Data (63) Continuation of application No. 10/204,715, filed as application No. PCT/CA01/00233 on Feb. 23, 2001, now abandoned.

(30) Foreign Application Priority Data

Feb. 25, 2000 (CA) .................................... 2299626
Apr. 28, 2000 (CA) .................................... 2307118

(51) Int. Cl.
*C01B 31/04* (2006.01)

(52) U.S. Cl. ........................ 423/448; 423/461
(58) Field of Classification Search .................. 423/448, 423/461
See application file for complete search history.

(56) References Cited

U.S. PATENT DOCUMENTS

| 4,435,375 A | 3/1984 | Tamura et al. |
| 5,756,062 A | 5/1998 | Greinke et al. |
| 5,882,818 A | 3/1999 | Fujimoto et al. |

FOREIGN PATENT DOCUMENTS

| AT | 220 123 | 3/1962 |
| EP | 0 573 266 | 12/1993 |
| EP | 0 738 018 | 10/1996 |
| EP | 0 916 618 | 5/1999 |
| JP | 3-50110 | 3/1991 |

OTHER PUBLICATIONS

Kim Kinoshita, "Electrochemical and Physicochemical Properties" Carbon, pp. 10-11, 22-23.
Jurgen O. Besenhard, Handbook of Battery Materials, pp. 232-233.
European Office Action dated Mar. 23, 2006 issued in corresponding Appln 01 909 376.4.

*Primary Examiner* — Stuart Hendrickson
(74) *Attorney, Agent, or Firm* — Buchanan Ingersoll & Rooney PC

(57) ABSTRACT

The present invention relates to the physical or chemical specific purification of natural mineral graphite. This purification is preferably applied to the surface of natural graphite in order to allow the formation of a passivation film during the first electrical discharge or the insertion of lithium in the graphite when the latter is used in a lithium-ion cell. The grinding to a small size before purification allows the optimization of the distribution of the particles, resulting in a more uniform electrode. This grinding is carried out in the presence of the natural impurities of the graphite that play the role of a micro-abrasive and result in a hardness of the graphite that increases its mechanical properties.

18 Claims, 4 Drawing Sheets

FIG_4

FIG. 5

SURFACE PREPARATION OF NATURAL GRAPHITE AND THE EFFECT OF IMPURITIES ON GRINDING AND THE PARTICLE DISTRIBUTION

CROSS REFERENCE TO RELATED APPLICATIONS

This application is a continuation of U.S. application Ser. No. 10/204,715, filed Mar. 17, 2003, which is a §371 national stage application of International Application No. PCT/CA01/00233, filed Feb. 23, 2001, and claims priority to Canadian Application No. 2,299,626, filed Feb. 2, 2005 and Canadian Application No. 2,307,118, filed Apr. 28, 2000.

FIELD OF INVENTION

The present invention relates to the physical and chemical purification specific to the mineral of natural graphite with the goal of generating a purified graphite which is particularly advantageous for use in carbon-lithium anodes. This purification is applied preferentially to the surface of natural graphite to permit the formation of a passivating layer with the first electrical discharge or insertion of lithium in the graphite when the graphite is used in a lithium-ion battery. Grinding to a very small size before the purification permits the optimisation of the size distribution of the particles, which gives rise to an electrode which is much more homogenous. This grinding is done in the presence of the natural impurities of the graphite which play a role as a micro abrasive and give a hardness to the graphite which increases its mechanical properties. It goes without saying that the purified graphite particles can have many other usages, notably in the field of car brakes and joints, and the nuclear field.

PRIOR ART

The negative carbon-lithium electrode has recently caused a great deal of interest in the industrial but also in the scientific community. In fact, the use of such an electrode in a rechargeable battery resolves the crucial problem of lithium metallic electrodes which are poorly recharged in liquid electrolytes because of the growth of dendrites once the charged density $(C/cm^2)$ and/or the current density $(mA/cm^2)$ exceed limiting values for the good operation of the battery. This major problem has slowed the arrival of lithium batteries in the classical formats (AA, C, D, etc.) to the public at large. The first such type of battery was commercialised at the beginning of the 1990s by Sony Energytech. This battery is said to be a lithium-ion and consists of a negative electrode made of carbon-lithium.

The operating principle of this electrode resides in the reversible insertion of lithium between layers of carbon. These layers are characterized by very strong anisotropic connective carbon-carbon forces within the layers (very strong covalent bonds) and between layers (very weak Van der Waals forces). Thus, because lithium is a very weak cation, it may rapidly diffuse between 2 D layers, forming bonds of the ionic type between layers without involving irreversible changes of the bonds within the layers. Only a slight spacing between layers is observed, thus accommodating the inserted lithium It is well known that the reversibility of electrochemical insertion of lithium in the carbon is far more favourable than the $Li^+$ cation deprived of its sphere of solvation when transferred from the electrolyte solution towards the interior of the solid carbon. Thus, the co-insertion of DMSO (dimethyl sulfoxide) and DME (dimethyl ether) causes a larger spacing between the layers (>300%) which thus contributes to a larger disorganisation of the structure of the host. The lithium thus inserted has, moreover, a more substantial mass and apparent volume, which reduces its mobility as well as its maximum concentration inside the layers. In addition, in propylene carbonate medium, the ternary compound is very unstable, the solvent reacts to become gaseous propene that can cause a violent degradation of the battery.

More recently, it was shown that carbons with an imperfect crystallinity (turbostratics) can insert lithium in a PC (propylene carbonate) medium or PC-DME without the co-insertion of the solvent. The difference in electrochemical behaviour of graphite of high crystallinity and carbon poorly crystallised such as coke treated at a temperature less than 1,800° C., may be caused by an overpressure due to propene generation which is greater than that with coke. However a first step of discharge results in the formation of a protective film at the surface of the carbon grains, produced by the decomposition of the solvent. Once formed, this film has a sufficient impedance to prevent the electron transfer necessary for the continued reduction of the solvent. However, it remains a conductor for $Li^+$ ions and because of this behaves as a solid electrolyte. It is also highly probable that this layer intervenes in the dissolution of the $Li^+$ ion during its transfer and/or reduction at the surface of the carbon.

Electricity consumed during this step cannot be recovered when the current is inverted. The faraday output of this first cycle is therefore poor. The reversible capacity measured after the following cycles is directly related to the nature of the carbon and the treatment it underwent as well as the nature of the electrolyte.

U.S. Pat. No. 5,882,818 deals with graphite of 1-40 μm. This study is based on the relationship between structure and electrochemistry. However no information concerning the purity of graphite or a process to obtain said is taught.

U.S. Pat. No. 5,756,062 discloses the modification of the surface of a high purity graphite. The graphite is not however one obtained directly from the mineral. The chemical modification of the graphite is performed by fluorine, chlorine or phosphorous treatment.

The graphite used conventionally as electrode material in a lithium-ion battery is generally obtained from two distinct sources: synthetic graphite or natural thermally highly purified graphite, preferably treated at temperatures higher than 2,500° C. This type of graphite although of excellent quality, is however very costly, and this has a direct impact on the cost of the final product eventually sold in the market. Moreover, the graphite is only reduced to the powder state after having been purified or synthesised, this causes certain problems during the grinding process. In effect, the uniformity of the size distribution of the particles in the powder is markedly altered, since pure graphite is very fragile. In fact, it can be said that the distribution is non-uniform. If a battery is produced directly with such a non-uniform graphite, it is clear that its lifetime will be greatly reduced. The alternative is then to filter the graphite and to collect only those particles having the wanted size, which involves additional process steps, and an increase in the cost of the resulting material.

It would be desirable to develop a purification process of a low cost graphite having electrochemical properties comparable or superior to those of the graphite presently being used as a material for electrodes in lithium-ion batteries. In a preferred embodiment, the process would result in a graphite

SUMMARY OF THE INVENTION

The present invention relates to a process for the preparation of graphite particles characterized by at least by the following consecutive steps:

a) a grinding of the graphite carried out until a particle size distribution between 1 and 50 µm is obtained;

b) a purification of the particles obtained in a) until impurities as well as sites of corrosion are substantially eliminated.

The graphite particles produced by the process of the invention have a size varying from 1 to 50 µm and are generally free of impurities and sites of corrosion. Preferably they have the following properties:

an interplanar distance d002, measured by X-rays, varying from 3.35 Å to 3.38 Å;
a specific surface varying from 0.4 to 55 $m^2/g$; and
a level of purity varying from 98.5% to 99.99%.

The invention also relates to a carbon metal anode, preferably lithium, based on a natural graphite obtained by the previously described process. Such an anode is particularly advantageous in an electrochemical battery such as a lithium-ion type.

Finally, in another aspect of the invention includes a purified graphite comprising particles having an external surface substantially stripped of impurities and sites of corrosion having an electric conductivity, used for a number of commercial applications.

DETAILED DESCRIPTION OF THE INVENTION

A new method has been developed to produce a purified graphite in the form of small particles which can be used in an electrochemical battery, for example, of the lithium-ion type, while maintaining a relatively uniform particle size distribution. This type of graphite which can equally be used in other applications, such as an electric conductor in a cathode (batteries) or fuel cells, or in the field of cars (breaks and joints) or in the nuclear field.

The present invention relates to a purification method, either chemical or physical, of impurities found on the surface of the natural graphite, i.e. where the passivating film is formed. The present method permits the removal of the impurities which can harm the formation of the passivating film and the cycling of the carbon-lithium anode. The grinding process is advantageously conducted before purification, this permits a better control of the size and the size distribution of the particles, where a more uniform powder does not require filtration to remove the oversized and undersized particles.

The subsequent purification step essentially seeks to remove impurities from the surface of the graphite particles which generate an electric conductivity, such as compounds comprising silica oxide and iron. Those compounds also cause the doping or the reduction by lithium of the compounds in which they are found. These phenomena should not be present or at least minimised in the passivating layer which will be formed at the surface of the electrode, because they will cause the degradation of the batteries efficiency, and ultimately a short circuit. On the other hand, the presence of surface impurities favouring ionic conductivity, such as calcium fluoride, have no negative impact on the graphite electrode performance, because they have a strong ionic character less favourable to electronic conductivity.

The impurities present in graphite a mineral are generally the following (in descending order of priority): Si>Ca>Fe>Mg>S>Al. As mentioned before, these compounds containing silica must be eliminated, on one hand because lithium reduces or dopes compounds containing silica (such as $SiO_2$, SiO and Si metal), and on the other hand these compounds of silicon are electronic conductors. This last property is completely incompatible with the properties of the passivating film, which represents a key element to a good carbon-lithium anode which is characterized by a long lifespan.

To eliminate compounds containing silicium, an acid treatment is used, for example with $H_2SO_4$, $HNO_3$, HCl, HF or their mixtures thereof. A treatment with HF or a fluoridated derivative allowing the generation of HF in the medium represents a particularly preferred embodiment. This treatment equally causes an interaction between the fluoride and the calcium already present in the mineral, leading to the formation of calcium fluoride, a compound which is strongly ionic, an electric insulator as well as a good anionic conductor at high temperatures. Moreover, the presence of calcium fluoride will not alter the formation of the passivating layer.

The present method of purification does not change the size of the particles produced by the grinding process. There is no agglomeration of particles, which are free and which may produce an homogenous mixture with the binder in order to produce an electrode of good quality (roughness, thickness, porosity, etc.).

To illustrate the present invention, a graphite mineral from StratminGraphite (Lac des îles-Québec), of a particle size about 375 µm was used. The particles were first ground until their size varied between 1 and 50 µm. It should be noted that once the particle size is less than 1 µm, the graphite loses its crystallinity and the term intercalation of lithium becomes doping.

The grinding process can be done by any method known to the person skilled in the art. These techniques include jet milling, air milling, ball milling, etc.

The purification step by thermal means can be accomplished by conventional means, i.e., in a furnace and at a sufficiently high temperature to allow the vaporisation of all impurities typically between 1,000 and 3,100° C.

The purification step by chemical means can be accomplished by different methods using acid compounds containing fluorine, nitrate, sulphate and chloride or basic compounds such as potassium or sodium hydroxide, in order to clean the surface of the graphite and to permit the subsequent formation of a stable passivating film at the time of the reduction of the electrolyte and during the first insertion of lithium in the graphite.

Typically, the purification method by chemical means can comprise:

only one step using fluoridated acid, preferably HF or one fluoridated derivative such as $NH_4F$, $NH_5F_2$, etc. which allow the generation of HF in the reaction mixture;

only one step using two different compounds, where one is HF or a fluoridated derivative as described above, and the other may consists of a non fluoridated acid such as HCl, $HNO_3$, $H_2SO_4$ etc. The use of two different compounds has the advantage of extracting more impurities that with one single acid or fluoridated derivative;

two steps, the first using a non fluoridated acid as defined above, followed by a second with HF or a fluoridated derivative as defined above; and two steps using a base such as KOH or NaOH followed by HF or a fluoridated derivative as defined above.

It will be noted that the addition of $HNO_3$ to the purification solvents ($H_2SO_4$—$NH_4F$) or (HCl—$NH_4F$) allows us to obtain in one step a purified and exfoliated graphite.

The purification steps by chemical means can be used independently or in series. For obvious cost reasons, chemical purification represents the preferred method of purification.

During the purification by chemical means, it is very important to choose concentrations of compounds added to achieve this end, as well as the operating conditions, in order to avoid all physical changes or exfoliation of the natural graphite. In this way, the concentration of HF or of fluoridated derivatives added for the purification has to be preferably between 10% and 50% (by weight) and at a process temperature which preferably does not exceed 250° C. in order to maximise the output. In the case where another acid is used, the concentration of this acid will vary preferably between 10 and 30%.

To carry out the purification by mechanical means, the graphite is milled by air milling, until the particles attain a size of approximately 20 µm. The impurities are then separated by flotation.

DRAWINGS

The invention will now be illustrated with the aid of the annexed drawings that are solely given for illustrative purposes and without limitations, in which

FIG. 3 illustrates the formation of an anode from graphite particles obtained according to the method of this invention;

Figure 1:
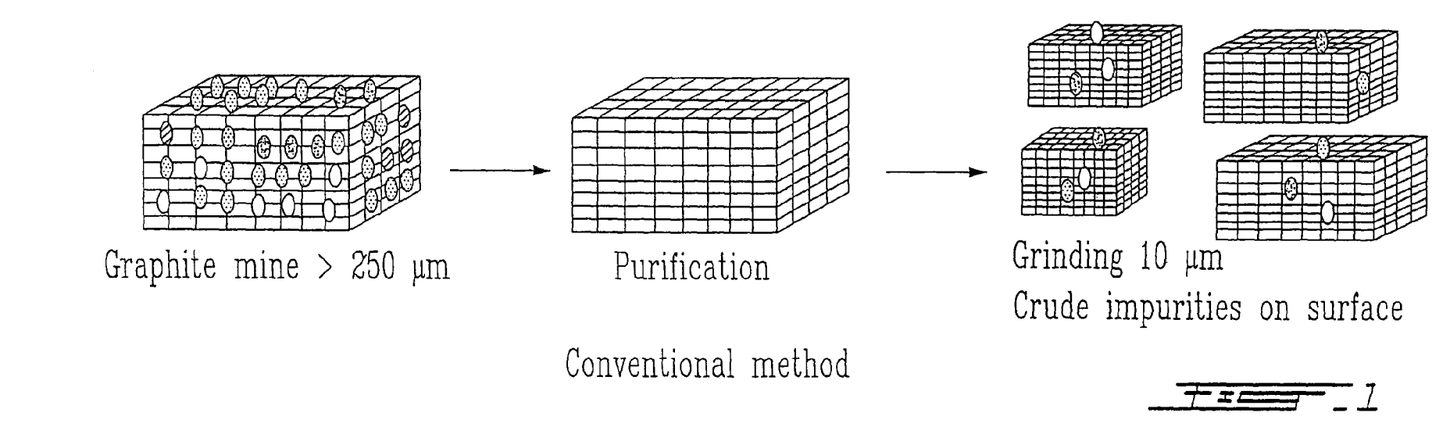
FIG. 1 is a diagram of the conventional method.
Figure 2:
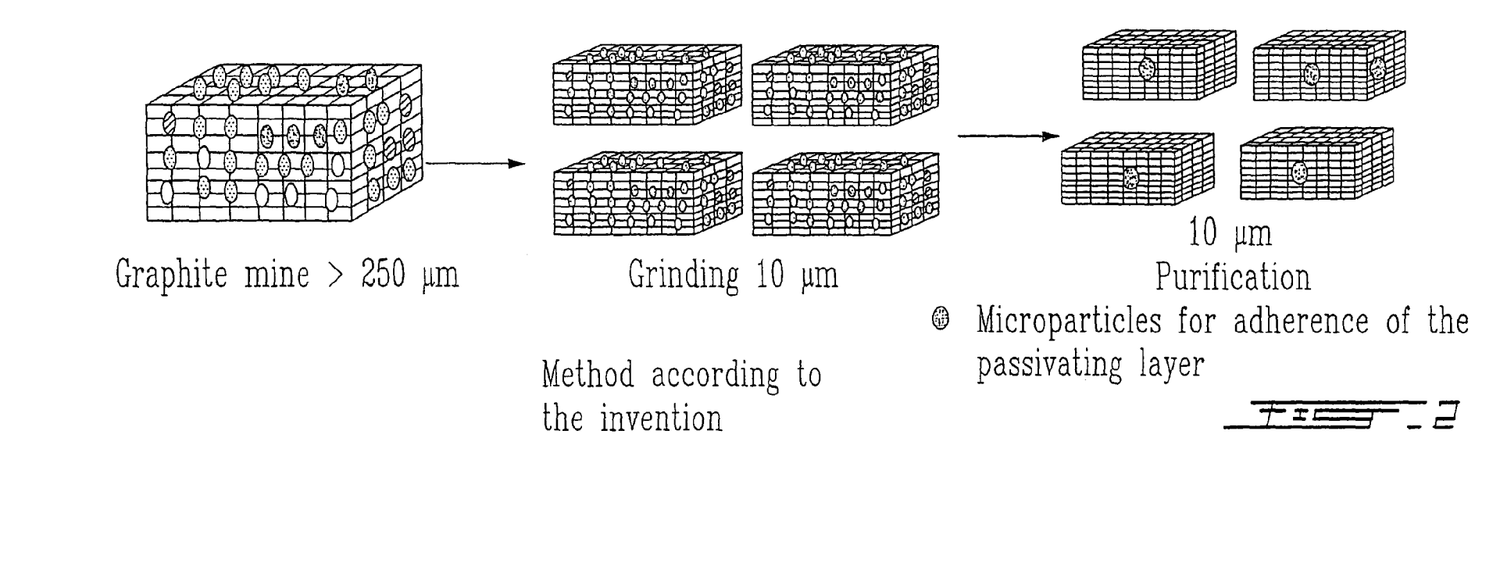
FIG. 2 is a diagram of the method according to the invention.

In referring to the drawings, it can be seen that according to the conventional method illustrated in FIG. 1, where purification proceeds grinding, there still remain many impurities on the surface. In addition, according to the method of the invention when the mineral contains calcium, there are no more impurities found on the surface. All that is found, are particles of $CaF_2$ which are produced during the course of purification, par chemical means precisely.

FIG. 3 illustrates the formation of an anode with particles of graphite obtained according to the method of the invention, which are deposited on a collector. During reduction, there is the formation of a passivating film, which is at the same time an ionic inductor, and electronic isolator, which represent ideal conditions for electrochemistry.

Figure 4:
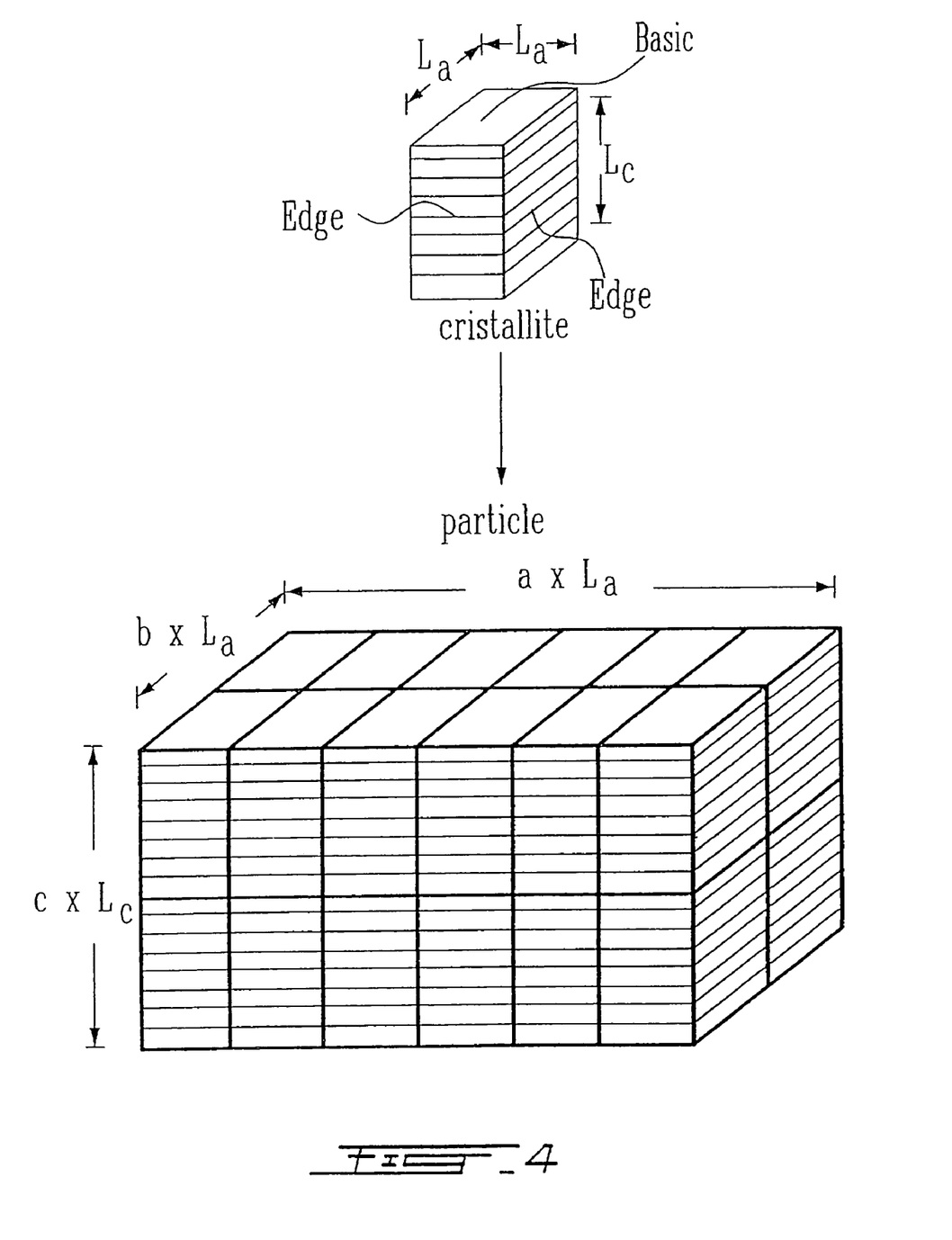
FIG. 4 illustrates a particle of graphite according to the invention formed from several crystallites.
Figure 5:
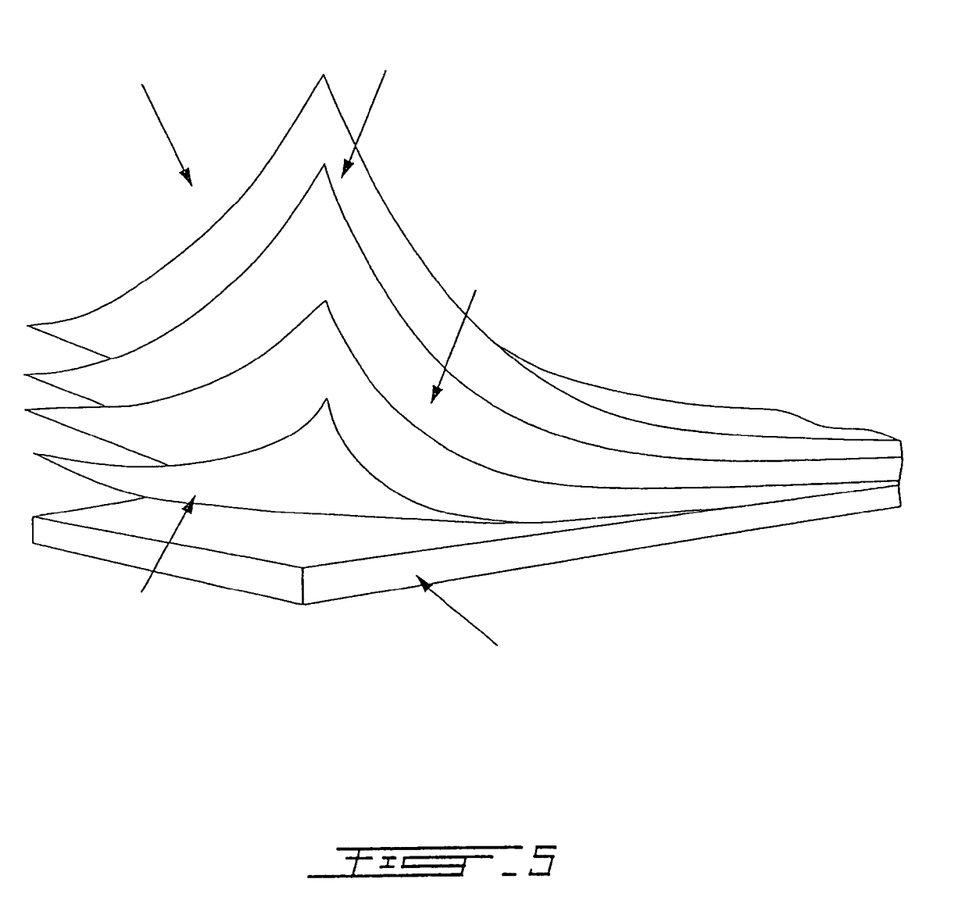
FIG. 5 illustrates the exfoliation of graphite in a particle according to the invention.

FIG. 4 shows that the graphite particle according to the invention is constituted by a group of crystallites. During the insertion of lithium into the graphite, it is very important that the Lc is controlled. In this case, very strong acids have been used for the purification, the Lc becomes very small and graphite illustrated in FIG. 5 is obtained.

The following examples are given to illustrate the preferred embodiments of the invention, and should not be considered as limiting its scope.

EXAMPLE 1

A natural graphite having an initial particle size of 375 µm is ground by a process of air milling until the particle size reaches 10 µm. The size of the main particles obtained (50% distribution of particles or D50%) is 10.52 µm. The Gaussian distribution of graphite has only one maximum and no additional peak. The granulometric distribution was determined with the aide of a Microtrac™ particle analyser built and sold by Leeds & Northrul. The methanol was used as the carrier fluid. Subsequently, the ground graphite was leached in an aqueous bath of 30% HF. The temperature of the mixture is maintained at 90° C., with a leached time of 180 minutes. The graphite is then filtered, washed with copious amounts of water, and the powder dried for a period of 24 hours at 120° C.

The graphite powder obtained is analysed by reversed diffusion coupled with EDX (Energy Dispersive X-ray). No exfoliation of the particles was observed. In addition the analysis by EDX shows that the majority of the impurities remaining are constituted by calcium. The purity of this sample is 99.6%, as obtained by the analysis of the impurities found in the ashes after incineration.

The graphite is mixed with a binder of polyvinylidene fluoride (PVDF) (Kruha: KF-1700) and with N-methylpyrolidone in a mass ratio of 90:10. The mixture is then applied to a collector of copper by the method of Doctor Blade™.

The graphite electrode thus obtained is dried under vacuum at 120° C. for 24 hours. The said electrode is placed in a button size battery of type 2035 (diameter 20 mm, thickness 3.5 mm). A Celgard™ separator 2300 soaked in electrolyte 1M $LiPF_6$+EC/DMC:50/50 (ethylene carbonate+dimethylcarbonate) is used. The metallic lithium is used as a reference and a counter-electrode.

The electrochemical tests were conducted at ambient temperature. The discharge and charge curves were obtained between 0 V and 2.5 V in C/24. The first coulombic output is 85%, which is superior to commercial graphite used in lithium-ion batteries (typically 81%). The reversible capacity is 365 mAh/g equivalent at x=0.98 in $Li_xC_6$. This obtained value is very close to the theoretical value for graphite (372 mAh/g). No negative effect is associated with the presence of residual Ca impurities is observed.

EXAMPLE 2

Natural, graphite having an initial particle size of 375 µm is ground by a process of air-milling until the particles attain a size of 10 µm. The graphite is then leached in a mixed aqueous bath comprising 30% $H_2SO_4$ and 30% HF. 106.5 ml of the mixed acid is heated to 90° C., and 30 g of graphite is then added into the solution. The graphite is leached for 180 minutes in a reactor. The solid is then filtered, washed with copious amounts of water, and dried at 120° C. for 24 hours. The size (D50%) is 10.92 µm, and this before and after purification. The Gaussian distribution for the graphite has only one single maximum without any peak.

The analysis of impurities in the graphite by EDX shows mainly the presence of the elements Ca and F. Analysis of the impurities of the residual ashes shows the graphite purity to be 99.68%. The electrode preparation and the electrochemical tests are done using the same procedure described in example 1.

The coulombic efficiency of the first cycle is 90%. The irreversible plateau caused by the passivating layer is formed normally near 800 mV. This means that the elements Ca, F or $CaF_2$ have no influence on the formation of the passivating film. The reversible capacity of graphite is 356 mAh/g, or equivalent to x=0.96 for the formation $Li_xC_6$.

EXAMPLE 3

The natural graphite used in this example is processed in an identical manner as that described in Example 2, with the exception that the HF concentration is now 20%. Analysis of the impurities in the graphite by EDX shows the main presence of the elements Ca and F. The analysis of the impurities of the residual ashes shows the graphite to have a purity of 99.75%. The preparation of the electrode and the electrochemical tests were conducted with the identical procedures described in example 1.

The coulombic efficiency of the first cycle is 89%. The irreversible plateau due to the passivating layer is formed normally near 800 mV. The reversible capacity of the graphite is 365 mAh/g, equivalent to x=0.98 for the formation $Li_xC_6$.

EXAMPLE 4

The natural graphite used in this example is processed in an identical manner as that described in Example 2, with the exception that the concentration of HF is of 10%. The preparation of the electrode and the electrochemical test are identical to the procedures described in Example 1.

The coulombic efficiency of the first cycle is 75%. The irreversible capacity of 106.7 Ah/g is very high compared to that of the graphite in Examples 2 and 3, which were leached respectively in HF 30% and HF 20%. The reversible capacity is 318 mAh/g, equivalent to x=0.85 for the formation of $Li_xC_6$.

EXAMPLE 5

The natural graphite used in this example is processed in an identical manner as that described in Example 2, with the exception of the $H_2SO_4$—HF mixture wherein HF is replaced by $NH_4F$, also present in the concentration of 30%.

The analysis of the impurities in this graphite by EDX shows the main presence of the elements Ca and F. The analysis of the impurities of the residual ashes shows the graphite to have a purity of 99.64%. The preparation of the electrode and the electrochemical tests are identical to the procedures described in Example 1.

The coulombic efficiency of the first cycle is 90%. The irreversible capacity of the graphite is 44 mAh/g. The reversible capacity is 352 mAh/g, equivalent to x=0.96 for the formation of $Li_xC_6$.

EXAMPLE 6

The natural graphite used in this example is processed in an identical manner as described in Example 2 with the exception that in the $H_2SO_4$—HF mixture HF is replaced by $NH_4F$, HF ($NH_5F_2$) at a concentration of 30%.

The analysis of impurities of the graphite by EDX shows the presence, in majority, of Ca and F. The analysis of the impurities of the residual ashes shows the graphite to have a purity of 99.57%. The preparation of the electrode and the electrochemical tests are identical to those described in Example 1.

The coulombic efficiency of the first cycle is 88%. The irreversible capacity is 49 mAh/g. The reversible capacity is 346.7 mAh/g, equivalent to x=0.93 for the formation $Li_xC_6$.

EXAMPLE 7

A natural graphite having an initial particle size of 375 μm is ground by a process of air-milling until the particles achieve a size of 10 μm. The graphite is leached in two steps. Initially, with an aqueous solution of 30% HCl, followed by an aqueous solution of 30% BF. For each leach step, 106.5 ml of acid solution is heated to 90° C., and 30 g of graphite are added. The graphite is leached for 180 minutes in a reactor. The solid is filtered, washed with copious amounts of water and dried at 120° C. for 24 hours.

The size (D50%) is 10.02 μm. The Gaussian distribution of graphite has a single maximum with no flattening.

The analysis of impurities in the graphite by EDX shows the total absence of the elements Si and Ca. The element found in the impurities, in majority, is sulphur. An analysis of the impurities found in the residual ashes shows the graphite to have a purity of 99.9%. The preparation of the electrode and the electrochemical tests performed are identical to the procedures described in Example 1.

The coulombic efficiency of the first cycle is 88%. The irreversible plateau of the passivating layer is normally formed at 800 mV. One can conclude that the presence of sulphur has no harmful effect on the formation of the passivating film. The reversible capacity of the graphite is 357 mAh/g which is equivalent to x=0.96 for the formation of $Li_xC_6$.

EXAMPLE 8

The natural graphite used in this example was processed in the same manner identical to that described in Example 7 but replacing HCl with $HNO_3$.

The size (D50%) of graphite is 10.26 μm. The Gaussian distribution of the graphite has only one maximum and no additional peak.

The analysis of the impurities of the graphite by EDX shows the presence of the elements Ca and Mg, but the complete absence of Si. The analysis of impurities found in the residual ashes shows the graphite purity to be 99.96%. The preparation of the electrode and the electrochemical tests are identical to the procedures described in Example 1.

The coulombic efficiency of the first cycle is 86%. The irreversible plateau of the passivating layer is formed normally near 800 mV, which confirms that the elements Ca and Mg have no influence on the formation of the passivating layer. The reversible capacity of graphite is 353 mAh/g which is equivalent to x=0.95 for the formation of $Li_xC_6$.

EXAMPLE 9

The natural graphite used for this example is processed in the same manner as that described in Example 7 with HCl being replaced by a base notably KOH, at a concentration of 30%.

The analysis of the impurities of graphite by EDX shows the presence of the elements Ca and F. The analysis of impurities found in the residual ashes shows the graphite to have a purity of 99.77%.

The coulombic efficiency of the first cycle is 88%. The reversible capacity of graphite is 345 mAh/, which is equivalent to x=0.93 for the formation of $Li_xC_6$.

EXAMPLE 10

A graphite comprising particles of 375 μm is initially purified in a bath of BF according to the following procedure. 106.5 ml of acid are heated to 90° C., and 30 g of graphite are added. The graphite is leached for 180 minutes in the reactor. The solid is then filtered, washed with copious amounts of water and dried at 120° C. for 24 hours.

Subsequently, the graphite is ground until the particle size reaches 10 μm by the procedure previously described. The size (D50%) is 10.67 μm. The distribution of graphite has two maxima with a flattening of the level at a size >18 μm. It is well known that this type of distribution is less favourable to the optimal functioning of carbon-lithium anodes, and illustrates the better uniformity of natural graphite ground before its purification.

The analysis of impurities of the graphite by EDX shows the presence of Ca and Mg in large quantity as impurities. An analysis of the impurities found in the residual ashes shows the graphite to have a purity of 99.43%. The preparation of the electrode and the electrochemical tests are identical to the procedures described in Example 1.

The coulombic efficiency of the first cycle is 75%. The value of 110 mAh/g of the irreversible capacity is high due to its purity (99.43%) and its elevated specific surface (7.08 m$^2$/g). The reversible capacity of the graphite is 356 mAh/g, which is equivalent to x=0.96 in the formation of Li$_x$C$_6$.

EXAMPLE 11

The graphite used in this example is prepared according to the method of Example 10. The conditions of purification and grinding are the same as used in Example 7.

The size (D50%) of the graphite particles is 12.40 μm. The distribution has two maxima, the first at 10 μm, and the second at 17.7 μm.

The analysis of impurities of the graphite by EDX shows the presence of an intense peak for Si followed by one for Mg and another for Ca. The analysis of impurities found in the residual ashes shows the graphite to have a purity of 99.95%. The preparation of the electrode and the electrochemical tests are identical to the procedures described in Example 1.

The coulombic efficiency of the first cycle is 86%. The irreversible capacity is 59 mAh/g. The reversible capacity is 362 mAh/g, which is equivalent to x=0.97 for the formula Li$_x$C$_6$.

EXAMPLE 12

The natural graphite used in this example is processed in a manner identical to that of Example 11 but replacing HCl for HNO$_3$.

The particle size (D50%) of the graphite is 12.11 μm. The distribution has two maxima, a first at 8 μm and a second at 18 μm.

The analysis of impurities in the graphite by EDX shows the presence of Ca. The analysis of the impurities found in the residual ashes shows the graphite to have a purity of 99.99%. The preparation of the electrode and the electrochemical tests are identical to the procedures described in Example 1.

The coulombic efficiency of the first cycle is 88%. The irreversible capacity is 56 mAh/g. The reversible capacity is 396.9 mAh/g which is equivalent to x=1.066 according to the formulation Li$_x$C$_6$.

As we can see in Examples 10 through 12, in purifying before grinding the graphite produced has physical and chemical properties which are less advantageous.

EXAMPLE 13

According to the procedure of Example 1, the initial size of graphite is taken from 375 μm to 10 μm by a process of grinding. The graphite is then subjected to a thermal treatment at high temperature (2,800° C.) for 2 hours. The analysis of the impurities in the graphite by EDX shows the absence of these.

The coulombic efficiency of the first cycle is 87%. The irreversible capacity is 54.7 mAh/g. The reversible capacity is 346 mAh/g, which is equivalent to x=0.93 for the formation of Li$_x$C$_6$.

EXAMPLE 14

In this example, natural Chinese graphite is used having a higher Si content but a lower content of Ca than graphite from StratminGraphite.

The leaching and the electrochemical preparation of the graphite are identical to those of Example 2.

The coulombic efficiency of the first cycle is 88%. The reversible capacity is 350 mAh/g, which is equivalent to x=0.94 for the formation of Li$_x$C$_6$.

From this example we note that natural graphite containing impurities of silicon (silicate) in relatively low concentrations with respect to Ca and Mg impurities, is favourable to the preferred embodiments of the invention.

This purification process allows the control of the interplanar distance Lc (FIG. 3). In the field of lithium-ion batteries, the control of this parameter minimises the co-insertion of solvent and stabilises the passivating film. The fact that in this purification process, the grinding of particles is done first and the purification is done second, permits the removal of all new edges which appear after grinding with oxygen bonds, this fact reduces the level of oxygen in the product. This process at the same time eliminates oxidation of graphite and reduces the irreversible capacity due to the formation of LiO$_2$.

EXAMPLE 15

A natural graphite of Brazilian origin (table 1) having an initial particle size of 323 μm is ground by a process of air-milling until the particles reach a size of 20 μm. This powder is processed in a manner identical to that described in Example 5, with a H$_2$SO$_4$—NH$_4$F mixture at a concentration of 30%.

The analysis of the impurities found in the residual ashes show the graphite to have a purity of 99.99%. The specific surface is 4.285 m$^2$/g. The preparation of the electrode and the electrochemical tests are identical to the procedures described in Example 1.

The coulombic efficiency of the first cycle is 91.0%. The irreversible capacity of the graphite is 37 mAh/g. The reversible capacity is 353 mAh/g which is equivalent to x=0.95 according to the formation of Li$_x$C$_6$.

EXAMPLE 16

A natural graphite from Lac Knife (Québec, Canada) (table 2) having an initial particle size of 323 μm is ground by an air-milling process until the particles reach a size of 20 μm whereas the level of oxygen is 1.9%. The powder is processed in an identical manner to that described in Example 5, with a H$_2$SO$_4$—NH$_4$F mixture at a concentration of 30%. After leaching, the level of oxygen is reduced to 0.18%. It is clear that the process according to the invention greatly reduces the level of oxygen.

The analysis of the impurities found in the residual ashes shows the graphite to have a purity of 99.24%. The specific surface is 2.696 m$^2$/g. The preparation of the electrode and the electrochemical tests are identical to the procedures described in Example 1.

The coulombic efficiency of the first cycle is 91%. The irreversible capacity of the graphite is 36 mAh/g. The reversible capacity is 353 mAh/g which is equivalent to x=0.95 according to the formation Li$_x$C$_6$.

EXAMPLE 17

The natural graphite used in this example is identical to that used in Example 15. It was processed in an identical manner as that described in Example 5 however replacing the H$_2$SO$_4$ with HCl.

The analysis of impurities found in the residual ashes shows the graphite to have a purity of 99.99%. The preparation of the electrode and the electrochemical tests are identical to the procedures described in Example 1.

The coulombic efficiency of the first cycle is 89.4%. The irreversible capacity of the graphite is 43 mAh/g. The reversible capacity is 367 mAh/g which is equivalent to x=0.986 according to the formation $Li_xC_6$.

EXAMPLE 18

The natural graphite used in this example is identical to that used in Example 15 with an average particle size of 10 µm. The graphite is leached in a bath with an aqueous mixture comprising 150 ml of HCl (30%) and 1.0 g of $CaF_2$. The mixture is heated to 90° C., and 20 g of graphite are added to the solution. The graphite is leached for 180 minutes in a reactor. The solid is then filtered, washed with copious amounts of water and dried at 120° C. for 24 hours.

The analysis of impurities found in the residual ashes shows the graphite to have a purity of 99.84%. The preparation of the electrode and the electrochemical tests are identical to the procedures described in Example 1.

The coulombic efficiency of the first cycle is 85%. The irreversible capacity of the graphite is 64 mAh/g. The reversible capacity is 366 mAh/g, which is equivalent to x=0.98 according to the formation $Li_xC_6$.

EXAMPLE 19

The natural graphite used in this example is identical to that used in Example 18. The natural graphite is processed in the same manner as described in Example 18 but replacing HCl with $H_2SO_4$ (30%) and $CaF_2$ by 1.5 g of LiF.

The analysis of impurities of the residual ashes shows the graphite to have a purity of 99.99%. The preparation of the electrode and the electrochemical tests are identical to the procedures described in Example 1.

The coulombic efficiency of the first cycle is 82%. The irreversible capacity of the graphite is 77.5 mAh/g. The reversible capacity is 365 mAh/g which is equivalent to x=0.98 according to the formation $Li_xC_6$.

TABLE 1

Brazilian graphite (NATIONAL DE GRAFITE LTDA)
CHEMICAL SUBSTANCE (PPM)

| Fe | Mo | Sb | As | V | Cr | Cu | Ni | Pb | Co | Ca | Al | Ge | Si |
|---|---|---|---|---|---|---|---|---|---|---|---|---|---|
| 103 | 1.5 | <1 | <0.5 | 9.7 | 6.5 | 4.2 | 0.3 | <1 | 0.5 | 3 | 528.8 | <1 | 0.3 |

TABLE 2

Lac Knife graphite (MAZARIN)
CHEMICAL SUBSTANCE (PPM)

| Ba | Be | Cd | Ce | Co | Cu | Dy | Eu | La | Li | Mo | Nd | Ni | Pb | Pr |
|---|---|---|---|---|---|---|---|---|---|---|---|---|---|---|
| 320 | <1 | <2 | 59 | 6 | 1000 | <1 | <1 | 47 | 73 | 2400 | <25 | 404 | 410 | <10 |

| Sc | Sm | V | Zn | Ga | Nb | Rb | Sn | Sr | Ta | Te | Th | U | Y | Zr |
|---|---|---|---|---|---|---|---|---|---|---|---|---|---|---|
| 17 | 20 | 2600 | 775 | 21 | 23 | 200 | <10 | 180 | <5 | <10 | <3 | 64 | 55 | 650 |

Although the present invention is described by specific embodiments, it is understood that many variations and modifications can be added on top of the embodiments, the present application attempts to cover such modifications, uses or adaptations of the present invention covering in general, the principles of the invention including all variations of the present description which become known or conventional in the field of activity in which this present invention is found, and which can be applied to the essential elements mentioned above, and in agreement with the range of the following claims.

The invention claimed is:

1. A process for the preparation of natural graphite particles which are surfaced-purified and suitable for use an anode, said process comprising at least the following consecutive steps:
   a) a grinding of the natural graphite particles, carried out until said particles attain a size between 1 and 50 micrometers; and
   b) a purification of the graphite particles obtained in step a) performed by a chemical process according to one of the following steps:
      i one step purification in an aqueous acid medium containing at least one fluoridated derivative generating HF, in this case the concentration of fluoride derivative represents from 10 to 50% of the total weight of the acid medium; or
      ii one step purification using a fluoride compound generating HF and a non-fluoridated acid, the concentration of the fluoridated derivative generating HF ranging from 10 to 50% in weight and the acid concentration other than HF ranging from 10 to 30% in weight; or
      iii two-steps purification, using first a non-fluoridated acid then a derivative generating HF, the concentration in fluoridated derivative generating HF ranging from 10 to 50 weight % and the concentration in non-fluoridated acid ranging from 10 to 30% percent,
   wherein the step b) of purification being carried out for less than 16 hours and at a temperature lower than 250° C. and the resultant purified graphite particles are natural graphite particles which are surfaced-purified and suitable for use an anode.

2. The process according to claim 1, wherein the duration of step b) is lower or equal to 180 minutes.

3. The process according to claim 1, wherein the step b) comprises a single purification step using a fluoridated derivative generating HF.

4. The process according to claim 3, wherein the derivative generating HF is selected from the group consisting of $NH_4F$, $NH_5F_2$ or XF, X being an alkaline or rare earth metal, or a mixture thereof.

5. The process according to claim 1, wherein the derivative generating HF is selected from the group consisting of $NH_4F$, $NH_5F_2$ or XF, X being an alkaline or rare earth metal, or a mixture thereof.

6. The process according to claim 5, wherein the purification in step b) is performed by an acid in the presence of at least two salts generating two acids, one of which is HF.

7. The process according to claim 1, wherein the purification in step b) is performed by an acid in the presence of at least two salts generating two acids, one of which is HF.

8. The process according to claim 7, wherein the graphite is selected in the group constituted by the graphites of Chinese, Lac des îles-Québec, Lac Knife and Brazilian type.

9. The process according to claim 1, wherein the graphite is selected in the group constituted by the graphites of Chinese, Lac des îlcs-Québec, Lac Knife and Brazilian type.

10. The process according to claim 1, wherein the step b) is step i.

11. The process according to claim 1, wherein the step b) is step ii.

12. The process according to claim 1, wherein the step b) is step iii.

13. A process for the preparation of natural graphite particles which are surfaced-purified and suitable for use an anode, said process comprising at least the following consecutive steps:
   a) a grinding of the natural graphite particles, carried out until said particles attain a size between 1 and 50 micrometers; and
   b) a purification of the graphite particles obtained in step a) performed by a chemical process according to one of the following steps:
      i purification in an aqueous acid medium containing $H_2SO_4$, $HNO_3$, HCl or mixture thereof, in this case, the acid concentration represents from 10 to 30 weight percent of the total weight of the aqueous acid medium; or
      ii purification in a basic medium containing at least one fluoridated derivative generating HF, in this case the concentration of fluoridated derivative represents from 10 to 50% of the total weight of the aqueous basic medium; or
      iii two steps purification, using first a base such as KOH or NaOH, then a derivative generating HF; the concentration of the base ranging from 10 to 30 weight % and the concentration of the derivative generating HF ranging from 10 to 30%
   wherein the step b) of purification being carried out for less than 16 hours and at a temperature lower than 250° C.

14. The process according to claim 13, wherein the step b) is step i.

15. The process according to claim 13, wherein the step b) is step ii.

16. The process according to claim 13, wherein the step b) is step iii.

17. The process according to claim 13, wherein the duration of step b) is lower or equal to 180 minutes.

18. The process according to claim 17, wherein the derivative generating HF is selected from the group consisting of $NH_4F$, $NH_5F_2$ or XF, X being an alkaline or rare earth metal, or a mixture thereof.

* * * * *